United States Patent Office 3,847,892
Patented Nov. 12, 1974

3,847,892
OCTAPEPTIDE SOLID PHASE-FRAGMENT PROCESS AND PENTAPEPTIDE INTERMEDIATES
Su-San Wang, Bloomfield, N.J., assignor to Hoffmann-La Roche Inc., Nutley, N.J.
No Drawing. Filed June 29, 1973, Ser. No. 375,199
Int. Cl. C07c 103/52; C07g 7/00
U.S. Cl. 260—112.5          6 Claims

ABSTRACT OF THE DISCLOSURE

Semi-synthetic human insulin can be prepared by removing the B-chain C-terminal octapeptide from porcine insulin by trypsin hydrolysis followed by addition of the synthetic human insulin B-chain C-terminal octapeptide. The present disclosure relates to an improved process using solid phase and fragment condensation techniques for preparing an octapeptide intermediate to the known synthetic human insulin octapeptide. The solid phase segment of the process utilizes a conventional solid phase synthesis resin modified with a p-alkoxybenzyl alcohol linking group to serve as the insoluble anchor for building up the protected pentapeptide intermediate Z-Gly-Phe-Phe-Tyr(Bzl)-Thr(Bzl)-OH. This compound is a versatile substrate for the fragment condensation required to produce the desired octapeptide since the pentapeptide has a free terminal carboxyl group which can couple with the required tripeptide in a variety of ways.

BACKGROUND OF THE INVENTION

Ruttenburg (Science, 177, 623 (1972)) has described a method for the semisynthetic preparation of human insulin by selective enzymatic removal of the B-chain C-terminal octapeptide of porcine insulin followed by condensation of synthetic human insulin B-chain C-terminal octapeptide. In this manner a ready source of human insulin has become available since human insulin cannot readily be synthesized in toto at reasonable cost and porcine insulin is available in reasonable amounts and cost. The use of porcine insulin in the treatment of diabetes in humans produces immunologic intolerance in many patients after a period of time even though the porcine insulin differs from human insulin in the identity of only one amino acid located in the aforesaid B-chain C-terminal octapeptide.

The present invention provides a facile route for the preparation of a precursor to the synthetic human insulin octapeptide utilizing solid phase synthesis and fragment condensation techniques.

DESCRIPTION OF THE INVENTION

The present invention relates to a process and intermediates useful in the synthesis of the protected octapeptide Z-Gly-Phe-Phe-Tyr(Bzl)-Thr(Bzl)-Pro-Lys(Boc)-Thr-OCH$_3$. This compound has been utilized by Ruttenberg, supra, as the source of the B-chain C-terminal octapeptide in semisynthetic human insulin.

In the first step of the instant process the protected amino acid Bpoc-Thr(Bzl) is introduced onto a p-oxybenzyl alcohol modified solid phase synthesis resin support. Suitable p-oxybenzyl alcohol modified resins are described in U.S. Patent Application Serial No. 191,472, filed Oct. 21, 1971 and entitled "Modified Solid Supports for Solid Phase Synthesis." A preferred modified resin for the purpose of the present invention is p-oxybenzyl alcohol copolystyrene-1% divinyl benzene resin.

The coupling reaction is conveniently carried out utilizing a condensing agent such as a carbodiimide, e.g., dicyclohexylcarbodiimide, N-cyclohexyl - N' - (4-diethylaminocyclohexyl)-carbodiimide, N-ethyl-N'-(3-dimethylaminopropyl)-carbodiimide and the like. Additionally, a bidentic organic nitrogen base will be present in the reaction medium. Suitable bidentic organic nitrogen bases include 4-diC$_{1-7}$ lower alkylaminopyridines such as 4-dimethylaminopyridine and the like. The reaction is preferably conducted in an inert organic solvent, most preferably in a halogenated hydrocarbon such as dichloromethane, chloroform, or a 1:1 mixture of dichloromethane and dimethylformamide and the like. A temperature in the range of from about 0 to 40° C., most preferably about room temperature is employed.

The resulting product which can be represented as Bpoc - THR(Bzl)-OCH$_2$-C$_6$H$_4$-OCH$_2$-C$_6$H$_4$-resin is then benzoylated in a conventional manner such as by treatment of the foregoing compound with a benzoylating agent such as benzoyl chloride in the present of an aromatic amine such as pyridine at a temperature in the range of from about −10 to 10° C., most preferably at about 0° C. so as to produce Bpoc-Thr(Bzl)-OC$_2$-C$_6$H$_4$-resin so as to eliminate any unreacted hydroxy groups on the resin.

The aforesaid compound is then deprotected in conventional manner by treatment with 0.5% trifluoroacetic acid, neutralized with C$_{1-7}$ trialkylamine base, e.g., 10% triethylamine in dichloromethane and then coupled with the protected amino acid Bpoc-Tyr(Bzl) in the presence of a condensing agent such as dicyclohexylcarbodiimide. This reaction cycle is carried out at a temperature in the range of from about 10 to 30° C., most preferably at about room temperature. Similar solvents as are employed in the coupling reaction to the modified resin, i.e., chlorinated hydrocarbons or mixtures with dimethylformamide can be used for this reaction cycle.

The above synthetic cycle of deprotection, neutralization and then coupling of an additional protected amino acid to the anchored peptide chain is then repeated with the following protected amino acids being used for each respective cycle: Bpoc-Phe, Bpoc-Phe and Z-Gly.

The product pentapeptide Z-Gly-Phe-Phe-Tyr(Blz)-Thr(Bzl)-OH having a free terminal carboxyl group, is obtained by cleavage of the resin bound material utilizing 50% trifluoroacetic acid in the conventional manner.

The aforesaid pentapeptide is a versatile intermediate in that it can be coupled to the required tripeptide of HCl·Pro-Lys(Boc)-Thr-OCH$_3$ in a number of ways. Suitable procedures include the DCC/HOBT, DCC/HOSU, EEDQ, diphenylphosphoryl azide, 2-ethyl-4,5,6,7-tetrahydrobenzo[d]-1,2-oxazolium tetrafluoroborate and other similar procedures known in the art for coupling peptides having a free amine group to peptides having a free carboxyl group. A preferred coupling procedure is the DCC/HOBT method wherein the said pentapeptide is coupled to said tripeptide by reacting said peptides in the presence of 1-hydroxybenzotriazole and a condensing agent such as dicyclohexylcarbodiimide. The coupling is carried out in a polar, non-protic solvent such as a dimethylformamide to which a tri-C$_{1-7}$ lower alkylamine such as triethylamine may be added. The reaction temperature in the range of from about −10 to 40° C., preferably at about room temperature.

The product Z - Gly-Phe-Phe-Tyr(Bzl)-Thr(Bzl)-Pro-Lys(Boc)-Thr-OCH$_3$, produced above is a known precursor of the human insulin B-chain C-terminal octapeptide as described by Ruttenburg, supra.

As used herein the following terms and abbreviations have the indicated meanings:

Z=carbobenzoxy
Boc=t-butyloxycarbonyl
Bzl=benzyl
Bpoc=2-p-biphenyl-2-propyloxycarbonyl
OCH$_3$=methyl ester Phe=phenylalanine
Thr=threonine
Tyr=tyrosine
Gly=glycine
Pro=proline
DCC=dicyclohexylcarbodiimide
DMF=dimethylformamide
HOBT=1-hydroxybenzotriazole
HOSU=N-hydroxysuccinimide
EEDQ=N-ethoxycarbonyl-2-ethoxy-1,2-dihydroquinoline All amino acids having a center of chirality have the natural or L-configuration.

The present invention will be more clearly understood by reference to the following examples wherein all temperatures are in degrees centigrade.

Example 1

Bpoc-Thr(Bzl)-OCH$_2$-C$_6$H$_4$-OCH$_2$-C$_6$H$_4$-Resin

HOCH$_2$-C$_6$H$_4$-OCH$_2$-C$_6$H$_4$-Resin (10 g.) prepared as described in U.S. Patent Application Serial No. 191,472, was washed three times with CH$_2$Cl$_2$ and suspended in 100 ml. of the same solvent when 3.3 g. of 4-dimethylaminopyridine (26.9 mmoles) was added followed by 11.86 g. of Bpoc-L-Thr(Bzl) (26.5 mmoles) and 5.56 g. of DCC (26.9 mmoles). The mixture was stirred at room temperature for 3 hours and then the esterified resin collected and washed with CH$_2$Cl$_2$, DMF and MeOH. The product was then benzoylated with 3.18 ml. of pyridine and 3.75 ml. benzoyl chloride at 0° for 15 minutes. After washings as above 11.34 g. of the desired product was obtained. The amount of threonine attached to the resin was determined to be 0.39 mmoles/g. by the ninhydrin method (S. Moore and W. H. Stein, *J. Biol. Chem.*, 211 907 (1954)).

Example 2

Z-Gly-Phe-Tyr(Bzl)-Thr(Bzl)-OH

Bpoc-Thr(Bzl)-OCH$_2$-C$_6$H$_4$-OCH$_2$-C$_6$H$_4$-resin (1.1 g., 0.43 mmoles) prepared as above was deprotected with 0.5% TFA and neutralized with 10% triethylamine in CH$_2$Cl$_2$ and then coupled with 0.66 g. of Bpoc-L-(Bzl) in the presence of 0.27 g. DCC. The synthetic cycle was repeated with Bpoc-L-Phe (0.525 g.), Bpoc-L-Phe (0.525 g.) and Z-Gly (0.273 g.) to give the pentapeptide resin Z - Gly - Phe-Phe-Tyr(Bzl)-Thr(Bzl)-OCH$_2$-C$_6$H$_4$-OCH$_2$-C$_6$H$_4$-resin. The peptide was cleaved from the resin by 50% TFA (30 min.) and the resin particles removed by filtration. On evaporation of the filtrate, a colorless oil obtained was treated with ether which immediately turned the product into white solid powder (m.p. 203–207°). It was dissolved in 20 ml. of hot methanol, filtered to remove dusts and lints and allowed to cool down gradually overnight. White crystalline solid accumulated was collected by suction and washed with ether to give 0.25 g. (61%, calculated from Thr content on the resin) of Z-Gly-Phe-Phe-Tyr(Bzl) - Thr(Bzl) - OH, m.p. 205–208°. [α]$_D^{25}$= +13.97° (c.=0.94, HOAc). NMR spectrum agreed with the structure.

*Analysis.*—Calcd. for C$_{55}$H$_{57}$N$_5$O$_{10}$ (948.0): C, 69.68; H, 6.06; N, 7.39. Found: C, 69.39; H, 5.90; N, 7.35.

Example 3

Z-Gly-Phe-Phe-Tyr(Bzl)-Thr(Bzl)-Pro-Lys(Boc)-Thr-OCH$_3$

Z-Gly-Phe-Phe-Tyr(Bzl)-Thr(Bzl)-OH (0.15 g.) was dissolved in 1 ml. of DMF and cooled in an ice-bath. Triethylamine (0.1 ml.) was added followed immediately by 0.08 g. of HCL·Pro-Lys(Boc)-Thr-OCH$_3$, 0.05 g. 1-hydroxybenzotriazole and 0.054 g. of DCC. The reaction mixture was stirred at 0° for 1 hour and then overnight at room temperature. A few drops of acetic acid was added and the mixture filtered to remove insoluble by-products. The filtrate was then evaporated at 40° to dryness leaving a slightly brownish solid. It was taken up in 20 ml. of i-PrOH, filtered and evaporated to a syrup which solidified upon treatment with ether. The product was dissolved in a small volume of hot i-PrOH and allowed to cool down slowly to give 94 mg. (37%) of Z - Gly - Phe-Phe-Tyr(Bzl)-Thr(Bzl)-Pro-Lys(Boc)-Thr-OCH$_3$.

Example 4

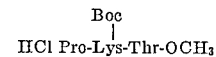
HCl Pro-Lys-Thr-OCH$_3$

Z-Pro-Lys(Boc)-Thr-OCH$_3$ (4.54 g., 7.66 mmoles) was dissolved in 120 ml. of methanol and 8.4 ml. of 1N HCl plus 22 ml. water. The mixture was hydrogenated at 55 p.s.i. for 17 hours in the presence of 1 g. catalyst (5% Pd on BaSO$_4$). Removal of the catalyst by filtration and the solvent by evaporation resulted in an oily syrup which on trituration in ether gave 3.6 g. of white powder. Part of the material (2.6 g.) was dissolved in a small volume of methanol and treated with ethyl acetate-ether. Crystalline product formed very slowly over several days. Recrystallization from the same solvents gave 1.2 g. (44%) of Boc
|
HCl Pro-Lys-Thr-OCH$_3$, m.p. 161–163°. [α]$_D^{25}$= −38.85° (c.=1.0, MeOH).

*Analysis.*—Calcd. for C$_{21}$H$_{38}$N$_4$O$_7$·HCl (495.02): C, 50.95; H, 7.94; N, 11.32. Found: C, 50.77; H, 7.94; N, 11.22.

What is claimed is:

1. Benzyloxycarbonyl - glycyl-L-phenylalanyl-L-phenylalanyl-O-benzyl-L-tyrosyl-O-benzyl-L-threonine.

2. A process for the preparation of the protected octapeptide

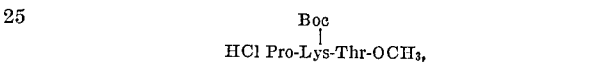

which process comprises in combination (A) coupling the protected amino acid Bpoc-Thr(Bzl) to a p-oxybenzyl alcohol modified solid phase synthesis resin support in the presence of a condensing agent and a bidentic organic nitrogen base;

(B) treating the resulting protected amino acyl resin with a benzoylating agent so as to block any unreacted hydroxy group on the resin;

(C) treating said benzoylated coupled amino acid with 0.5% trifluoroacetic acid to deprotect the aforesaid compound, neutralizing with C$_{1-7}$ trialkylamine base and then coupling the resulting product with the protected amino acid Bpoc-Tyr(Bzl) in the presence of a condensing agent;

(D) repeating step C utilizing as the protected amino acid Bpoc-Phe, Bpoc-Phe, and Z-Gly for each respective cycle;

(E) treating the resulting coupled polypeptide with 50% trifluoroacetic acid so as to produce the polypeptide free acid

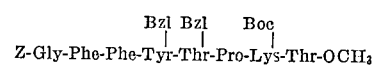

and, (F) reacting the polypeptide of step E with HCl·Pro-Lys(Boc)-Thr-OCH$_3$ in the presence of a condensing agent.

3. The process of claim 2 wherein said condensing agent in step A is dicyclohexylcarbodiimide and said bidentic organic nitrogen base is 4-dimethylaminopyridine.

4. The process of claim 2 wherein said p-oxybenzyl alcohol modified solid phase synthesis resin support is p-oxybenzyl alcohol copolystyrene—1% divinyl benzene resin.

5. The process of claim 2 wherein the condensing agent used in steps C and D is dicyclohexyl carbodiimide.

6. The process of claim 2 wherein the reaction of step F is carried out using dicyclohexylcarbodiimide as condensing agent in the presence of 1-hydroxybenzotriazole and a tri-$C_{1-7}$ lower alkylamine.

References Cited

UNITED STATES PATENTS 3,276,961  10/1966  Bodanszky et al. ____ 260—112.7

OTHER REFERENCES

Merrifield, Adv. in Enzymology, 32, 250 (1969).

LEWIS GOTTS, Primary Examiner

R. J. SUYAT, Assistant Examiner

U.S. Cl. X.R.

260—112.7